US 8,649,774 B1

(12) United States Patent
Zheng et al.

(10) Patent No.: US 8,649,774 B1
(45) Date of Patent: Feb. 11, 2014

(54) MISSED COMMUNICATION NOTIFICATION

(75) Inventors: Lantian Zheng, San Jose, CA (US); Zhi Dennis Weng, San Jose, CA (US)

(73) Assignee: Google Inc., Mountain View, CA (US)

( * ) Notice: Subject to any disclaimer, the term of this patent is extended or adjusted under 35 U.S.C. 154(b) by 3 days.

(21) Appl. No.: 13/475,344

(22) Filed: May 18, 2012

Related U.S. Application Data

(60) Provisional application No. 61/504,846, filed on Jul. 6, 2011.

(51) Int. Cl.
*H04M 1/725* (2006.01)

(52) U.S. Cl.
USPC .... 455/412.2; 455/567; 455/41.1; 455/404.2; 455/414.2; 455/456.1; 455/456.2; 455/456.3; 455/456.4; 455/456.5; 455/456.6; 455/552.1; 455/553.1; 340/7.58; 340/7.59

(58) Field of Classification Search
USPC ............... 455/412.2, 567, 41.1, 404.2, 414.2, 455/456.1–456.6, 552.1, 553.1; 340/7.58, 340/7.59
See application file for complete search history.

(56) References Cited

U.S. PATENT DOCUMENTS

| | | | |
|---|---|---|---|
| 6,337,972 B1 | 1/2002 | Jones et al. | |
| 6,745,025 B1 * | 6/2004 | Chow et al. | 455/417 |
| 6,871,214 B2 | 3/2005 | Parsons et al. | |
| 7,215,946 B1 | 5/2007 | Cardina et al. | |
| 7,493,110 B2 | 2/2009 | Jiang | |
| 2003/0020749 A1 * | 1/2003 | Abu-Hakima et al. | 345/752 |
| 2005/0143139 A1 | 6/2005 | Park et al. | |
| 2006/0099940 A1 | 5/2006 | Pfleging et al. | |
| 2006/0133590 A1 * | 6/2006 | Jiang | 379/201.01 |
| 2007/0072616 A1 | 3/2007 | Irani | |
| 2008/0002820 A1 * | 1/2008 | Shtiegman et al. | 379/211.02 |
| 2008/0171536 A1 | 7/2008 | Katz | |
| 2008/0192905 A1 | 8/2008 | Fujita-Yuhas | |
| 2009/0068993 A1 * | 3/2009 | Allen | 455/413 |
| 2009/0122786 A1 * | 5/2009 | Liu et al. | 370/352 |
| 2009/0214014 A1 * | 8/2009 | Cadiz et al. | 379/142.15 |
| 2009/0318118 A1 * | 12/2009 | Chang | 455/412.2 |
| 2010/0210290 A1 | 8/2010 | Riley et al. | |
| 2011/0141950 A1 * | 6/2011 | Patil | 370/261 |

OTHER PUBLICATIONS

"Mount, Power, and Play Your iPod in Your Car with the Belkin TuneBase FM for iPod and TuneBase FM for iPod nano," May 8, 2006, Belkin Press Release [online]. First accessed on Sep. 28, 2011. Retrieved from the Internet: <http://www.belkin.com/au/pressroom/releases/uploads/PR%20TuneBase%20FM.htm> (2 pgs.).

"Mount, Power, and Play Your iPod in Your Car with the Belkin TuneBase FM for iPod and TuneBase FM for iPod nano," May 8, 2006, Belkin Press Release [online]. First accessed on Sep. 28, 2011. Retrieved from the Internet: <http://www.belkin.com/au/pressroom/releases/uploads/PR%20TuneBase%20FM.htm> (2 pgs.).

* cited by examiner

*Primary Examiner* — Charles Appiah
*Assistant Examiner* — Edward Zhang
(74) *Attorney, Agent, or Firm* — Shumaker & Sieffert, P.A.

(57) ABSTRACT

Various aspects of this disclosure are directed to receiving, with a first computing device, an incoming communication. The first computing device may determine that a user has not an taken action with the first computing device with respect to the incoming communication. The first computing device may further identify a second device determined to be physically proximate to the first computing device, and may send an outgoing communication, based at least on the received incoming communication, to the identified second device.

18 Claims, 5 Drawing Sheets

MISSED COMMUNICATION NOTIFICATION

RELATED APPLICATION

This application claims the benefit of priority to U.S. Provisional Application No. 61/504,846, filed Jul. 6, 2011, the entire content of which is incorporated by reference herein.

TECHNICAL FIELD

This disclosure relates to computing devices, and more particularly to computing device notifications of missed communications.

BACKGROUND

Computing devices may be utilized for telephonic, email, and short messaging service (SMS) communications. Conventionally, computing devices, such as pager devices and cellular telephones, have been used for notification of important communications. When pagers or computing devices receive an incoming communication, they often provide an alert to the user of the incoming communication. For example, such devices may provide alerts such as an audio tone, a visible alert such as a blinking light, or a physical alteration such as vibration.

SUMMARY

In one example, various aspects of this disclosure are directed to a method includes receiving, with a first computing device, an incoming communication. The method further includes determining, with the first computing device, that a user has not an taken action with the first computing device with respect to the incoming communication, identifying, with the first computing device, a second device determined to be physically proximate to the first computing device, and sending, with the first computing device, an outgoing communication to the identified second device, wherein the outgoing communication is based on the received incoming communication.

In another example, various aspects of this disclosure are directed to a computer-readable storage medium comprising instructions that, when executed, cause one or more processors of a first computing device to perform operations that include receiving an incoming communication, determining that a user has not an taken action with the first computing device with respect to the incoming communication, identifying a second device determined to be physically proximate to the first computing device, and sending an outgoing communication to the identified second device, wherein the outgoing communication is based on the received incoming communication.

In another example, various aspects of this disclosure are directed to a computing device that includes an interface to receive an incoming communication. The device further includes at least one processor, a missed communication analysis module operable by the at least one processor to determine that a user has not an taken action with the first computing device with respect to the incoming communication, to identify a second device determined to be physically proximate to the computing device, and to send an outgoing communication to the identified second device, wherein the outgoing communication is based on the received incoming communication.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
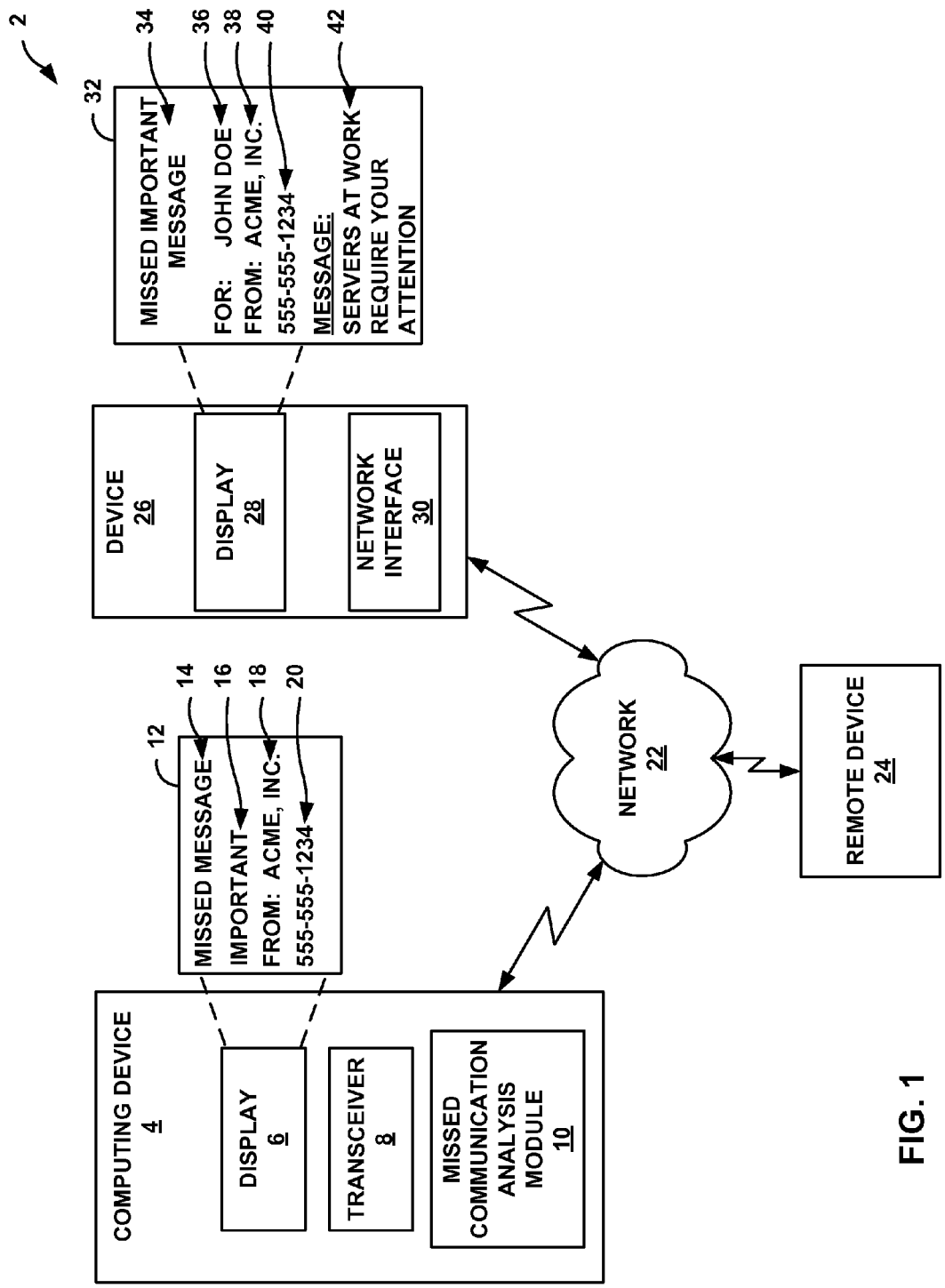
FIG. 1 is a block diagram illustrating an example communication system, in accordance with one or more aspects of this disclosure.

Computing devices, such as cellular telephones, may provide an alert to a user of an incoming communication. For example, computing devices may provide alerts such as an audio tone, a blinking light, or a vibration. While users may carry such devices almost everywhere they go, such devices are often carried in places where the notification system of the device may be rendered ineffective. For example, a user may be unable to hear the ringing of a cellular phone because the user is carrying the cellular telephone in a purse or pocket or the user may have left the telephone in one room of a house while moving to another room, which may result in the user being unaware of the incoming communication. In some examples, the incoming communication may be an important communication, such as a notification of an emergency to an on-call doctor. Missing such an important communication may have serious consequences, particularly if the user is unaware of the missed communication for a long period of time.

Various aspects of this disclosure may provide one or more advantages. For instance, one of more aspects of this disclosure may enable a computing device to determine that a received incoming communication has not been received by a user and to send an outgoing communication to a second device determined to be physically proximate to the computing device. In many cases, multiple network-enabled computing devices are present at a given location. Even though a user of a computing device may be unable to see or hear notifications from the computing device regarding an incoming communication, the user of the device may be in relatively close physical proximity to the computing device, such as in a different room of a house. In some cases, by sending the outgoing communication to the second device, determined to be physically proximate to the computing device, the user may be notified of the missed incoming communication.

As one example, the computing device may be a cellular telephone. The cellular telephone may receive an incoming communication such as a telephonic communication, a short messaging service (SMS) communication, or an email communication. The cellular telephone may determine that the incoming communication has not been received by a user, and may identify a second device determined to be physically proximate to the cellular telephone. For example, the cellular telephone may be preconfigured to communicate with another device, such as a speaker device, using a Bluetooth® protocol. Using the Bluetooth® protocol, the cellular telephone may send an outgoing communication to the speaker device based on the received incoming communication. The outgoing communication may cause the speaker device to play an audible message stating that the user of the cellular telephone missed the incoming communication.

The computing device may determine that the received communication is an important communication. In some examples, the computing device may send the outgoing communication to the identified second device in response to the determination that the received communication is an important communication. As one example, the computing device may identify a group of times indicating that incoming communications within the group of times are important communications. As another example, a calendar associated with the computing device may indicate that a user of the computing device is on-call for the user's employer during a group of times. The computing device may, in such an example, determine that incoming communications received during the times indicating that the user is on-call are important communications.

FIG. 1 is a block diagram illustrating an example communication system 2, in accordance with one or more aspects of this disclosure. As illustrated in FIG. 1, communication system 2 may include computing device 4, device 26, remote device 24, and network 22. Examples of computing device 4 and remote device 24 may include, but are not limited to, portable or mobile devices such as cellular phones, personal digital assistants (PDAs), portable gaming devices, portable media players, and e-book readers, as well as non-portable devices such as desktop computers. Examples of device 26 may include, but are not limited to, laptop computers, desktop computers, network routers or switches, cellular telephones, televisions, Blu-ray players, game consoles, mobile music players, and devices configured to communicate using the Bluetooth® protocol.

Computing device 4, remote device 24, and device 26 may be the same or different types of devices. For example, computing device 4, remote device 24, and device 26 may all be cellular phones. In another example, computing device 4 may be a cellular phone, remote device 24 may be a PDA, and device 26 may be a television.

Computing device 4, remote device 24, and device 26 are coupled to network 22 via wired or wireless links or both. Network 22 may include a telephone network such as a cellular telephone network, a wide-area network such as the Internet, a local-area network (LAN), an enterprise network, or one or more other types of networks. Computing device 4, remote device 24, and device 26 may communicate using voice connections or may transmit and receive data using network 22. In some examples, network 22 may include one or more different networks. For instance, remote device 24 and computing device 4 may communicate using a cellular telephone network and computing device 4 and device 26 may communicate using a LAN.

As illustrated in FIG. 1, computing device 4 may include display 6, transceiver 8, and missed communication analysis module 10. Transceiver 8 may be an interface configured to transmit data to and receive data from remote device 24, device 26, or one or more servers (not shown). Transceiver 8 may support wireless or wired communication, and may include appropriate hardware and software to provide wireless or wired communication. For example, transceiver 8 may include one or more of an antenna, modulators, demodulators, amplifiers, and other circuitry to effectuate communication between computing device 4, remote device 24, device 26, or one or more servers.

Display 6 may be a liquid crystal display (LCD), e-ink, organic light emitting diode (OLED), or other display. Display 6 may present the content of computing device 4 to a user. For example, display 6 may present a web browser, or other functions that may need to be presented to a user. In some examples, display 6 may be a touch screen that can allow a user to interact with the mobile communications device 4.

Computing device 4 may receive an incoming communication (e.g., using an interface such as transceiver 8), such as from remote device 24. Examples of incoming communications include, but are not limited to, telephonic communications, SMS communications, email communications, and the like. Computing device 4 may determine that the incoming communication has not been received by a user. For instance, missed communication analysis module 10 may determine that a telephonic communication has not been received by a user of computing device 4 if the phone call was not answered using the computing device or went to voicemail.

Display 6 may present graphical user interfaces for a user of computing device 4 to view information about incoming communications received by computing device 4. In the example of FIG. 1, screen illustration 12 may provide a user of computing device 4 with information about an incoming communication, such as a notification that a communication has been missed (e.g., notification 14), a priority level of the missed communication (e.g., priority 16), contact information about the missed communication (e.g., contact information 18), and a phone number of the missed communication (e.g., phone number 20).

Missed communication analysis module 10 may identify a second device determined to be physically proximate to computing device 4 (e.g., device 26). As an example, network 22 may include a LAN. Computing device 4 may send outgoing communications regarding missed communications over the LAN to the second device. Similarly, computing device 4 may be configured to receive communications (e.g., using transceiver 8) and the second device may be configured to send communications over the LAN. In such a way, computing device 4 and the second device may be preconfigured to communicate with each other using network 22.

As in the example illustrated in FIG. 1, device 26 may include display 28 and network interface 30. Network interface 30 may be an interface configured to transmit data to and receive data from computing device 4 or one or more other devices. Network interface 30 may support wireless or wired communication, and may include appropriate hardware and software to provide wireless or wired communication.

Screen illustration 32 may provide a user of device 26 with information about an incoming communication. For example screen illustration 32 may provide information such as a notification that a communication has been missed (e.g., notification 34), a priority level of the missed communication (e.g., notification 34), information about a user of computing device 4 that the incoming communication received by computing device 4 was intended for (e.g., user identification 36), contact information about the missed communication (e.g., contact information 38), a phone number of the missed communication (e.g., phone number 40), and one or more portions of the missed communication (e.g., message 42).

As an example, computing device 4 may receive an incoming communication, such as a phone call, from remote device 24. Missed communication analysis module 10 may determine that a user of computing device 4 (e.g., John Doe) has not taken an action with computing device 4 with respect to the incoming communication, because the phone call was not answered using computing device 4 or went to voicemail, as non-limiting examples. Further, missed communication analysis module 10 may determine that the communication was an important communication because, for example, the sender of the communication (e.g., ACME, INC.) is contained in a predefined list of senders of important communications.

Missed communication analysis module 10 may identify a second device determined to be physically proximate to computing device 4 (e.g., device 26). For instance, computing device 4 and device 26 may be preconfigured to communicate using a Bluetooth® protocol. Missed communication analysis module 10 may scan for the devices that computing device 4 is preconfigured to communicate with using the Bluetooth® protocol, and may identify device 26. Missed communication analysis module 10 may send an outgoing communication to device 26, using the Bluetooth® protocol, indicating that the user of computing device 4 (e.g., John Doe) missed an important communication. Further, missed communication analysis module 10 may include in the outgoing communication information such as the identity of the user of computing device 4, the identity of the sender of the missed communication, contact information of the sender, and one or more portions of the content of the missed communication. Screen illustration 32 may provide information regarding the missed communication, such as a notification that a communication has been missed (e.g., notification 34), a priority level of the missed communication (e.g., notification 34), information about a user of computing device 4 that the incoming communication received by computing device 4 was intended for (e.g., user identification 36), contact information about the missed communication (e.g., contact information 38), a phone number of the missed communication (e.g., phone number 40), and one or more portions of the missed communication (e.g., message 42).

Computing device 4 may receive multiple incoming communications, and may determine that one or more of the multiple incoming communications is a missed communication. For instance, computing device 4 may receive multiple incoming communications from remote device 24, or from one or more other devices connected to network 22 (not illustrated). As one example, computing device 4 may receive an incoming communication while processing an already received communication. Techniques of this disclosure may enable computing device 4 to process the multiple communications in parallel. For instance, computing device 4 may perform techniques of this disclosure on multiple incoming communications at the same time. Such parallel processing may be performed asynchronously, such that computing device 4 may perform various aspects of this disclosure in response to multiple incoming communications, and may perform the same or different aspects of this disclosure on each of the multiple incoming communications. As such, computing device 4 may determine that any number of incoming communications have not been received by a user and may send multiple outgoing communications to one or more second devices determined to be physically proximate to the computing device 4.

Figure 2:
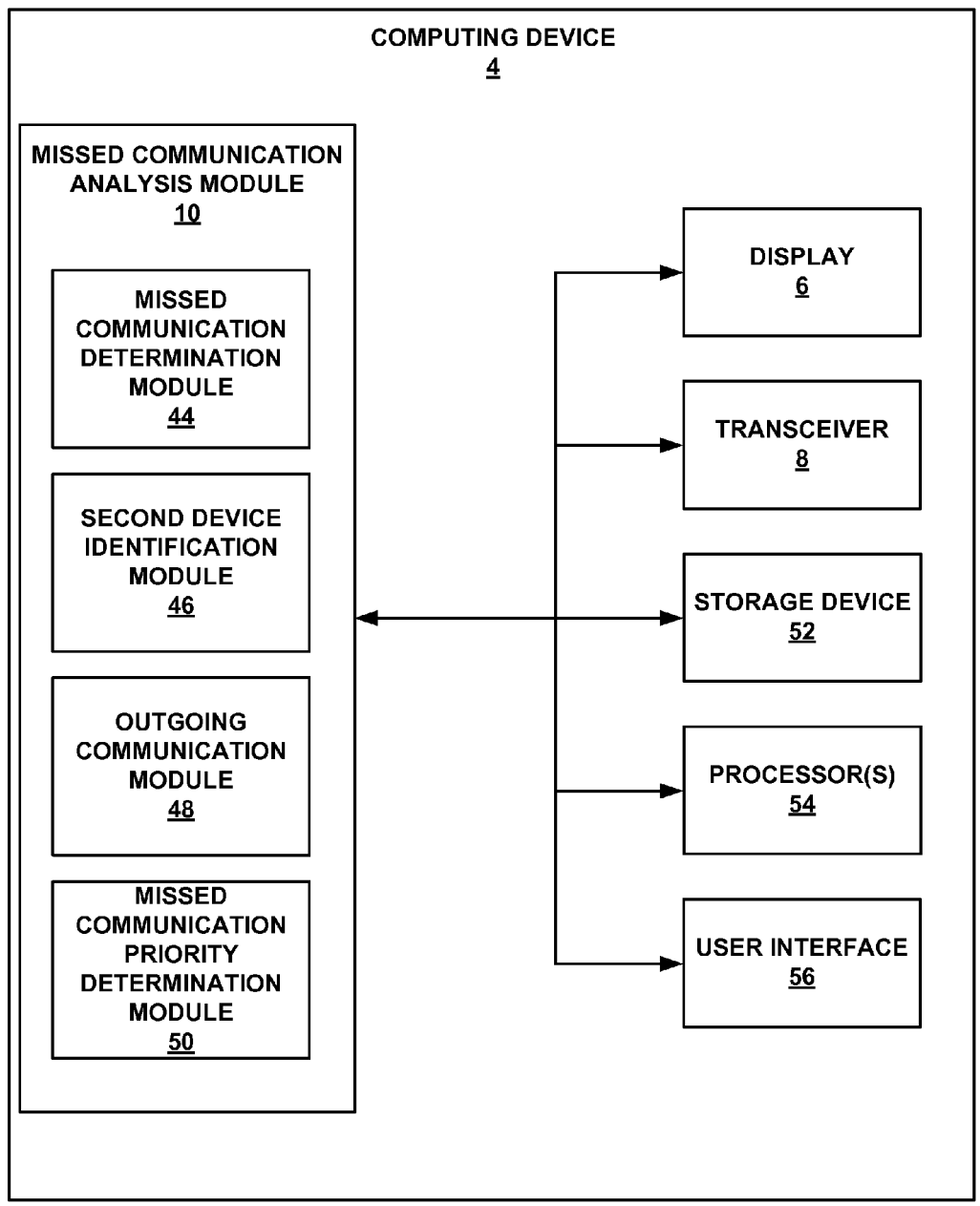
FIG. 2 is a block diagram illustrating an example computing device, in accordance with one or more aspects of this disclosure.

FIG. 2 is a block diagram illustrating an example computing device 4, in accordance with one or more aspects of this disclosure. As illustrated in FIG. 2, computing device 4 may include missed communication analysis module 10, storage device 52, one or more processors 54, display 6, user interface 56, and transceiver 8. Missed communication analysis module 10 may include missed communication determination module 44, second device identification module 46, outgoing communication module 48, and missed communication priority determination module 50.

Computing device 4 may include additional components not shown in FIG. 2 for clarity. For example, computing device 4 may include a battery to provide power to the components of computing device 4. Similarly, the components of computing device 4 shown in FIG. 2 may not be necessary in every example of computing device 4. For instance, if computing device 4 comprises a portable media player such as a music player, computing device 4 may not include display 6.

Although shown as separate components in FIG. 2, in some examples, one or more of missed communication determination module 44, second device identification module 46, outgoing communication module 48, and missed communication priority determination module 50 may be part of the same module. In some examples, one or more of missed communication determination module 44, second device identification module 46, outgoing communication module 48, missed communication priority determination module 50, and one or more processors 54 may be formed in a common hardware unit. In certain examples, one or more of missed communication determination module 44, second device identification module 46, outgoing communication module 48, and missed communication priority determination module 50 may be software and/or firmware units that are executed on or operable by one or more processors 54.

One or more processors 54 may include, in certain examples, any one or more of a microprocessor, a controller, a digital signal processor (DSP), an application specific integrated circuit (ASIC), a field-programmable gate array (FPGA), or equivalent discrete or integrated logic circuitry. In some examples, storage device 52 may store one or more instructions that cause one or more processors 54 and modules 44, 46, 48, and 50 to perform various functions ascribed to one or more processors 54, and modules 44, 46, 48, and 50.

Storage device 52 may include any form of machine- or computer-readable media. For example, storage device 52 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media.

Storage device 52 may, in some examples, be considered as a non-transitory storage medium. The term "non-transitory" may indicate that the storage medium is not embodied in a carrier wave or a propagated signal. However, the term "non-transitory" should not be interpreted to mean that the storage device 52 is non-movable. As one example, storage device 52 may be removed from computing device 4, and moved to another device. As another example, a storage device, substantially similar to storage device 52, may be inserted into computing device 4. In certain examples, a non-transitory storage medium may store data that can, over time, change (e.g., in RAM).

User interface 56 may allow a user of computing device 4 to interact with computing device 4. Examples of user interface 56 may include, but are not limited to, a keypad embedded on the computing device 4, a keyboard, a mouse, a roller ball, buttons, a touch screen, or other devices that allow a user to interact with computing device 4. In some examples, display 6 may present some or all of the functionality of user interface 56. For instance, display 6 may be a touch screen that can allow a user to interact with computing device 4.

Computing device 4 may receive incoming communications (e.g., using transceiver 8). Examples of incoming communications include, but are not limited to, telephonic communications, a short messaging service (SMS) communications, or email communications. Missed communication determination module 44 may determine that the user has not taken an action with computing device 4 with respect to the incoming communication (e.g., the user missed the incoming communication). For example, missed communication determination module 44 may determine that the user has not taken an action with computing device 4 with respect to an incoming telephonic communication because the phone call was not answered using computing device 4 or went to voicemail. As an example, missed communication determination module 44 may determine that the user has not taken an action with computing device 4 with respect to an incoming SMS or email communication based on a status of the SMS or email message indicating that the message has not been opened for viewing by a user. As another example, missed communication determination module 44 may determine that the user has not taken an action with computing device 4 with respect to an incoming communication because computing device 4 has not detected or received any user input or has not detected any movement (e.g., using an accelerometer, compass, proximity sensor, or other component of computing device 4) since receiving the incoming communication.

In some cases, missing a communication may have serious consequences to a user of computing device 4, particularly if the communication is an important communication or the user is unaware of the missed communication for a long period of time. Various aspects of this disclosure may enable computing device 4 to identify a second device determined to be physically proximate to computing device 4. In some examples, the second device may be physically proximate to the user of computing device 4. By sending an outgoing communication to the identified second device, computing device 4 may facilitate the notification of the user of the missed communication.

Second device identification module 46 may identify a second device determined to be physically proximate to computing device 4. In certain examples, second device identification module 46 may identify the second device determined to be proximate to computing device 4 by identifying the second device as one of a group of devices connected to a network of which computing device 4 is also connected (e.g., network 22 of FIG. 1). For instance, the network may be a LAN or other wired or wireless network, such as a Wi-Fi network. Second device identification module 46 may identify a group of devices connected to the network, such as by querying a router on the network to receive a list of connected devices.

Second device identification module 46 may identify a second device determined to be physically proximate to computing device 4 by sending and receiving messages on one or more predefined ports using Transmission Control Protocol/Internet Protocol (TCP/IP) (e.g., using transceiver 8). As one example, computing device 4 and the second device may be configured to send and receive TCP/IP communications on one or more predefined ports. As such, computing device 4 and the second device may be preconfigured to communicate with each other using network 22. Second device identification module 46 may identify the second device by listening for responses to the outgoing communication on a predefined port.

In certain examples, computing device 4 may use zero configuration networking techniques, such as the Multicast Domain Name System (mDNS) protocol or the Universal Plug and Play (UPnP) protocol, to dynamically create a usable Internet Protocol (IP) network with the identified second device. For instance, one or more devices connected to network 22 may use the mDNS protocol to broadcast one or more services supported by the device, including information about the services including the service type, domain name, and optional configuration parameters. Computing device 4 may identify one or more services supported by the second device, and may send outgoing communications based on the one or more supported services.

In some examples, computing device 4 and a second device may be preconfigured to communicate using a Bluetooth® protocol. Second device identification module 46 may identify a second device by scanning for the devices that computing device 4 is preconfigured to communicate with using the Bluetooth® protocol. Second device identification module 46 may determine that the identified second device is physically proximate to computing device 4 because of a limited effective physical range of the Bluetooth® protocol (e.g., approximately 10 meters).

Second device identification module 46 may identify a second device determined to be physically proximate to computing device 4 based on the physical location of computing device 4. As an example, computing device 4 may determine a geographic location of the computing device, such as by obtaining geographic location information from a global positioning system (GPS) of computing device 4. As another example, computing device 4 may determine a geographic location of the computing device using triangulation techniques based on the signal strength to nearby cellular antenna towers.

In some examples, computing device 4 may determine a geographic location of computing device 4 using a calendar associated with a user of computing device 4 (e.g., a calendar stored in storage device 52 or on one or more servers connected to network 22 of FIG. 1). For instance, the calendar may indicate that the user of computing device 4 has an appointment at a particular geographic location. Computing device 4 may determine the likely geographic location of computing device 4 using the location information obtained from the calendar.

Computing device 4 may determine the physical location of computing device 4 using the time of day, the day of the week, or both. For instance, computing device 4 may determine that during the weekdays spanning Monday through Friday and between the hours of 9 am and 5 pm a user of computing device 4 is likely to be at work. Similarly, computing device 4 may determine that between the hours of 11 pm and 6 am the user of computing device 4 is likely to be at the user's home.

Second device identification module 46 may identify a second device determined to be physically proximate to computing device 4 using the determined physical location of computing device 4. As an example, second device identification module 46 may compare the determined geographic location of computing device 4 to a predefined list of locations. For instance, if the determined geographic location of computing device 4 corresponds to the predefined geographic location of the home of the user of computing device 4, second device identification module 46 may identify the second device as a one of a group of predefined devices associated with the user's home.

As one example, second device identification module 46 may determine the second device to be the user's landline telephone and may look up the phone number of the user's landline telephone in a list of contacts associated with computing device 4. As another example, the determined geographic location of computing device may correspond to a predefined geographic location of the workplace of the user of computing device 4. In such an example, second device identification module 46 may identify the second device as the user's work phone and may look up the user's work phone number in a list of contacts associated with computing device 4.

Second device identification module 46 may identify a second device determined to be physically proximate to computing device 4 based on a priority associated with a communication protocol used by computing device 4 to communicate with the second device. In some examples, the priority may be based on an estimated effective physical range associated with the communication protocol. Second device identification module 46 may determine that devices using protocols associated with shorter effective physical ranges are more likely to be in physical proximity to the computing device. As such, second device identification module 46 may associate a higher priority with those protocols that have a shorter effective physical range, and may place a lower priority on those protocols that have a longer effective range. For instance, because of the relatively short effective physical range of the Bluetooth® protocol (approximately 10 meters), second device identification module 46 may associate a highest priority level with Bluetooth® communication protocols and may assign one or more lower priority levels to other communication protocols (e.g., predefined or dynamically configured network protocols).

Second device identification module 46 may identify a second device determined to be physically proximate to computing device 4 based on a prioritized list of devices. In some examples, the priority may reflect the likelihood that the device is in physical proximity to computing device 4. In certain examples, the priority may reflect the likelihood that an outgoing communication to the second device will successfully reach the user of computing device 4.

For example, second device identification module 46 may identify multiple devices using one or more communication protocols and may identify the second device using a predefined prioritized list of devices. For instance, second device identification module 46 may identify a Blu-ray player, a laptop computer, and a television set connected to a Wi-Fi network. In such an example, a predefined prioritized list of devices may indicate that the laptop computer has the highest priority while the Blu-ray player has the lowest priority. Second device identification module 46 may identify the laptop computer as the second device based on the highest priority level associated with the laptop computer.

The prioritized list may be a preconfigured list, such as by a user of computing device 4. For instance, a user of computing device 4 may predefine a prioritized list of known devices in the user's home that are connected to a network. In some examples, second device identification module 46 may dynamically create or modify the prioritized list of devices, such as by assigning or modifying a priority level of a device based on previously successful communications with the device. For instance, after successfully communicating with a device, second device identification module 46 may increase the priority level of the device for future communications. In some examples, second device identification module 46 may increase the priority level of a device when computing device 4 receives an acknowledgment from a user that the user received an outgoing communication sent from computing device 4 to the device.

In certain examples, second device identification module 46 may identify a second user in order to attempt to notify the user of computing device 4 of a missed communication. For example, second device identification module 46 may determine that a second user, such as a spouse or a child of the user of computing device 4, may be in physical proximity to the user of computing device 4. Second device identification module 46 may identify the second user by accessing a list of contacts associated with computing device 4 that indicates a relationship between the user of computing device 4 and the second user (e.g., spouse, child, cousin, and the like). In addition, the list of contacts may associate the second user with one or more phone numbers, email addresses, or both. Second device identification module 46 may identify a second device associated with the second user (e.g., using the one or more phone numbers or email addresses associated with the second user in the list of contacts).

In some examples, second device identification module 46 may attempt to notify the user of computing device 4 of a missed communication by sending an instant messaging (IM) communication to an IM account of the user. In such an example, a user of computing device 4 may be notified of the missed communication if the user is logged into the IM account with a different device. In certain examples, computing device 4 may determine that the user is logged into an IM account, such as by determining that a status of the user's account indicates that the user is logged in. As one example, computing device 4 may send an IM to the user's IM account in response determining that the user is logged into the account. As another example, computing device 4 may send an IM to the user's IM account regardless of the status of the account, or without determining the status of the account.

Outgoing communication module 48 may send an outgoing communication (e.g., using transceiver 8), based on the received incoming communication, to the identified second device. Examples of outgoing communications may include, but are not limited to, one or more of telephonic communication, SMS communication, and email communication. The outgoing communication may include a notification from computing device 4 that the incoming communication was received, one or more portions of the incoming communication, or both. In certain examples, outgoing communication module 48 may forward the incoming communication to the identified second device. In some examples, outgoing communication module 48 may create a new message to be sent to the identified second device.

Missed communication priority determination module 50 may identify the second device and send the outgoing communication in response to determining that the received communication is an important communication. As one example, missed communication priority determination module 50 may determine that an incoming communication is an important communication based on a determination that the sender of the received communication is included in a predefined list of senders. The predefined list of senders may indicate that communications received from senders identified in the list are important communications.

The list of senders may include one or more of a phone number or an email address. As one example, the predefined list of senders may include a contact name or other identifier associated with one or more phone numbers or email addresses. For instance, the predefined list may include the phone number "555-555-1234." Missed communication priority determination module 50 may compare the phone number of a received phone call to the predefined list to determine that the phone number of the received communication matches the phone number "555-555-1234" and is therefore an important communication.

As another example, the predefined list may include the contact name "Joe Smith." Missed communication priority determination module 50 may compare the contact name (e.g., "Joe Smith") to a list associating the name "Joe Smith" to one or more phone numbers, email addresses, or both. Missed communication priority determination module 50 may compare the phone number or email address of a received message to entries in the predefined list in order to determine whether the received phone number or email address matches an entry in the list of important contact names (e.g., "Joe Smith") and is therefore an important communication.

Missed communication priority determination module 50 may determine that the received communication is an important communication based on the time of the incoming communication. As one example, missed communication priority determination module 50 may compare the time of the received communication to a group of predefined times indicating that incoming communications are important. When the time of the received communication falls within the group of predefined times, missed communication priority module 50 may determine that the missed communication is an important communication.

In certain examples, a user of computing device 4 may provide the group of times indicating that incoming communications are important (e.g., using user interface 56). In some examples, missed communication priority determination module 50 may identify the group of times using a calendar associated with computing device 4. For instance, a calendar associated with computing device 4 may indicate a group of times during which a user of computing device 4 is on-call for the user's employer. Missed communication priority determination module 50 may determine that the incoming communication is important when the time of the incoming communication is within the identified group of times indicating that the user is on-call.

Missed communication priority determination module 50 may determine that an incoming communication is not important based on a predefined list of times or a calendar entry indicating that incoming communications during such times are not important. For example, a user may specifically provide a list of times indicating that received communications are not important. For instance, a calendar entry associated with computing device 4 may indicate that a user of computing device 4 is on vacation. As such, missed communication priority determination module 50 may determine that incoming communications received during those times that indicate the user is on vacation are not important.

Missed communication priority determination module 50 may determine that a received communication is an important communication based on the content of the received communication. For example, missed communication priority determination module 50 may search an email communication, SMS communication, or textual transcription of a voice communication for words or phrases indicating that the received communication is an important communication. Examples of such keywords or phrases include, but are not limited to, "important," "urgent," "emergency," "immediate attention," and "please respond immediately." In some examples, communications such as emails may be assigned a high priority by the sender. Missed communication determination module 50 may determine that such communications are important based on the high priority assigned by the sender.

Missed communication priority determination module 50 may determine that a received communication is an important communication based on a communication history stored in a communication log associated with computing device 4. For example, one or more of a phone call history, an SMS communication history, or an email history may be stored in a communication log of storage device 52 or on one or more servers connected to network 22 (FIG. 1). As one example, missed communication priority determination module 50 may determine that a received communication is an important communication when the number of received communications from one or more of a phone number, email address, or contact name exceeds a threshold number of communications within a threshold time.

For instance, missed communication priority determination module 50 may determine that a received communication is important if computing device 4 receives three or more phone calls from the same phone number within three minutes. As another example, missed communication priority determination module 50 may determine that a received communication is important if computing device 4 receives four or more communications (e.g., phone calls, emails, or SMS messages) from the same contact name (e.g., "Joe Smith") within five minutes.

Computing device 4 may receive a communication indicating that the outgoing communication has been received by a user of computing device 4. In certain examples, the communication indicating that the user of computing device 4 has received the outgoing communication may be sent from the identified second device to which the outgoing communication was sent. For instance, the identified second device may reply to an email or SMS communication indicating that the user of computing device 4 has received the outgoing communication sent by computing device 4. In some examples, the communication indicating that the user of computing device 4 has received the outgoing communication may be sent by a device separate from the identified second device. For instance, a user may send a confirmation email or SMS message from a separate device indicating that the outgoing communication has been received by the user. As one example, computing device 4 may be configured to log into an IM account of the user, and may receive a confirmation IM indicating that the outgoing communication has been received by the user. In certain examples, computing device 4 may receive confirmation that the user of computing device 4 has received the outgoing communication such as by a button press or other interaction with computing device 4. For instance, a user may press a button on computing device 4 acknowledging that the user has received the outgoing communication.

Computing device 4 may determine that the outgoing communication has not been received by a user of computing device 4 if, for example, computing device 4 has not received, within a threshold amount of time, a communication indicating that the outgoing communication has been received by the user. In response, computing device 4 may identify a third device, separate from the second device, and may send an outgoing communication based on the received incoming communication to the identified third device.

As one example, a user of computing device 4 may preconfigure the threshold amount of time as five minutes, such as by using user interface 56. After sending an outgoing communication to an identified second device indicating that the user of computing device 4 missed an incoming communication, computing device 4 may wait for five minutes to receive a communication indicating that the outgoing communication has been received by the user. If no such communication is received by computing device 4 within five minutes of sending the outgoing communication, computing device 4 may identify a third device. For instance, the third device may be one of a group of devices identified as physically proximate to computing device 4 when computing device 4 identified the second device. In examples where computing device 4 identified the second device from a group of devices based on a priority level, computing device 4 may identify the third device as the device with the next highest priority level as compared to the second device.

Computing device 4 may send an outgoing communication to the identified third device and, in a similar fashion, may wait for a preconfigured amount of time (e.g., five minutes) to receive an incoming communication indicating that the outgoing communication has been received by a user of computing device 4. In some examples, computing device 4 may identify a fourth device, separate from the second device and third device, if no such communication is received within the preconfigured amount of time. In certain examples, computing device 4 may continue to identify devices and send outgoing communications indicating that the user missed an incoming communication until computing device 4 is no longer able to identify additional unique devices. In other examples, computing device 4 may continue to identify devices and send outgoing communications until a preconfigured threshold number of devices has been reached (e.g., a threshold number of devices preconfigured using user interface 56).

Figure 3:
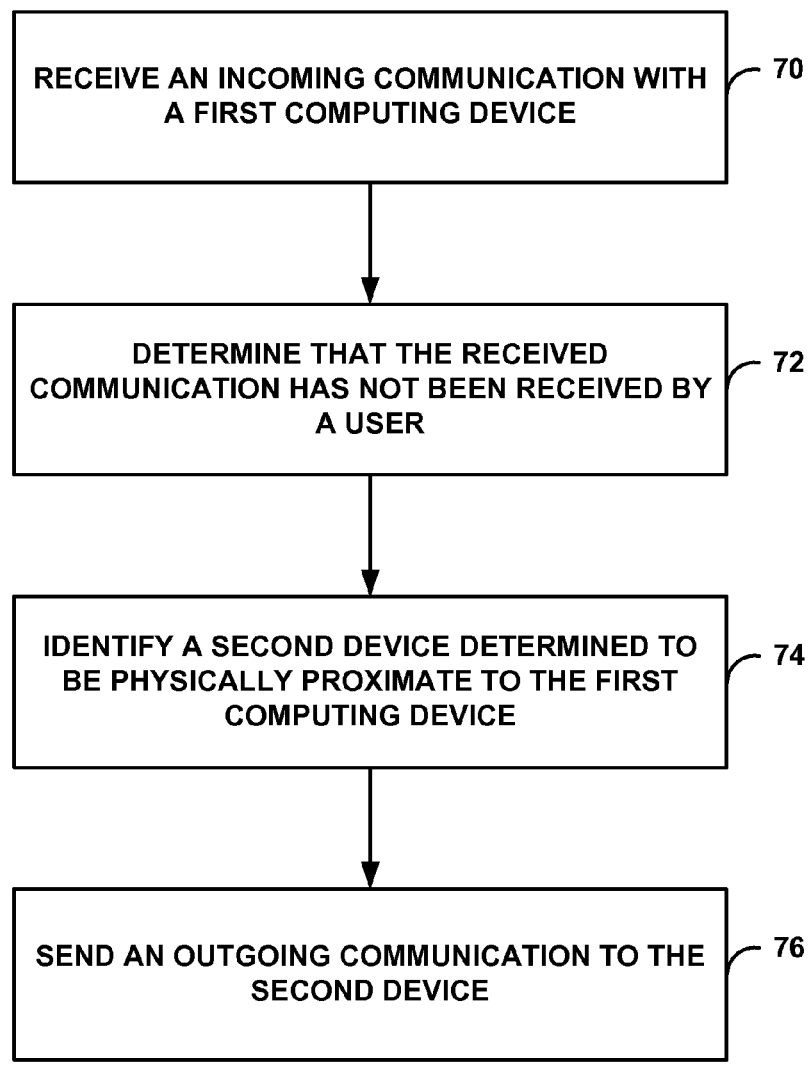
FIG. 3 is a flow diagram illustrating an example operation of a computing device for notifying another computing device of a missed communication, in accordance with one or more aspects of this disclosure.

FIG. 3 is a flow diagram illustrating an example operation of a computing device for notifying another computing device of a missed communication, in accordance with one or more aspects of this disclosure. For purposes of illustration only, the example method is described below within the context of communication system 2 of FIG. 1 and computing device 4 of FIG. 2. Computing device 4 may receive an incoming communication (70) (e.g., using transceiver 8). Computing device 4 may determine that the received communication has not been received by a user (72). For instance, missed communication determination module 44 may determine that an incoming telephonic communication has not been received by a user because the phone call was not answered using computing device 4 or went to voice mail.

Computing device 4 may identify a second device determined to be physically proximate to computing device 4 (74) (e.g., using second device identification module 46). For example, computing device 4 may identify the second device as one of the devices in a group of devices connected to a network (e.g., network 22) to which computing device 4 is connected. In some examples, computing device 4 may dynamically configure computing device 4 and the second device to communicate with each other using the network. In certain examples, computing device 4 and the second device may be preconfigured to communicate with each other using the network (e.g., using a Bluetooth® protocol).

Computing device 4 may send an outgoing communication to the identified second device (e.g., using outgoing communication module 48) (76). As one example, the outgoing communication may include a notification that the first computing device received the incoming communication. In some examples, the outgoing communication may include content of the incoming communication. Examples of outgoing communications may include, but are not limited to, one or more of a telephonic communication, an SMS communication or an email communication.

Figure 4:
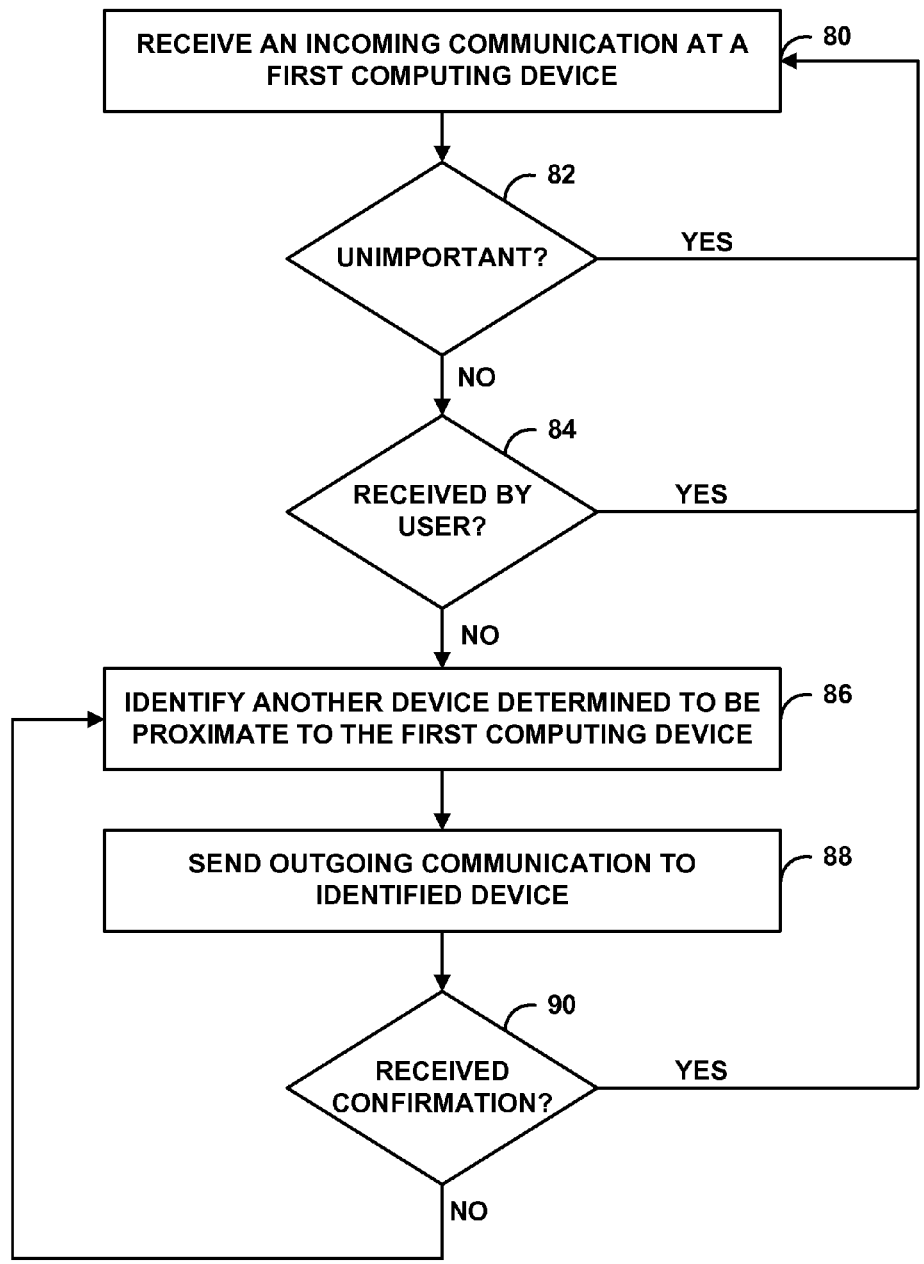
FIG. 4 is a flow diagram illustrating an example operation of a computing device for notifying another computing device of a missed communication, in accordance with one or more aspects of this disclosure.

FIG. 4 is a flow diagram illustrating an example operation of a computing device for notifying another computing device of a missed communication, in accordance with one or more aspects of this disclosure. For purposes of illustration only, the example method is described below within the context of communication system 2 of FIG. 1 and computing device 4 of FIG. 2. Similarly, for purposes of illustration only, the example method is described below with respect to a single incoming communication. However, it should be understood that the example operation illustrated in FIG. 4 may be performed with respect to multiple incoming communications, in parallel, in series, or both.

Computing device 4 may receive an incoming communication (80) (e.g., using transceiver 8). Computing device 4 may determine whether the incoming communication is unimportant (82). For example, computing device 4 may determine that the received communication is an important communication (e.g., using missed communication priority determination), and may determine that an incoming communication that is not determined to be important is unimportant. As an example, computing device 4 may determine that the received communication is an important communication by determining that the sender of the received communication is identified in a predefined list of senders. In certain examples, computing device 4 may identify a group of times indicating that incoming communications are important. In such examples, computing device 4 may determine that the received communication is an important communication when the time of the incoming communication is within the identified group of times (e.g., using missed communication priority determination module 50).

In certain examples, computing device 4 may identify a group of content indicating that incoming communications are important and may determine that the missed communication is an important communication based on the content of the received communication and the identified group of content. For instance, missed communication priority determination module 50 may determine that a keyword or phrase within the content of the incoming communication indicates that the received communication is important (e.g., "important," or "immediate attention required").

When the incoming communication is determined to be unimportant ("YES" branch of 82), computing device 4 may wait to receive another incoming communication. When the incoming communication is not determined to be unimportant ("NO" branch of 82) (i.e., the incoming communication is determined to be important), computing device 4 may determine whether the received communication has been received by a user (84). For example, missed communication determination module 44 may determine that an incoming telephonic communication has not been received by a user because the phone call was not answered using computing device 4 or went to voicemail.

When the incoming communication is determined to have been received by a user ("YES" branch of 84), computing device 4 may wait to receive another incoming communication. When the incoming communication is not determined to have been received by a user ("NO" branch of 84), computing device 4 may identify another device determined to be physically proximate to computing device 4 (86) (e.g., a second device identified by second device identification module 46).

Computing device 4 may send an outgoing communication to the identified device (e.g., using outgoing communication module 48) (88). For example, computing device 4 may send one or more of a telephonic communication, SMS communication, and email communication that may include a notification from computing device 4 that the incoming communication was received, one or more portions of the incoming communication, or both. In some examples, computing device 4 may forward the incoming communication to the identified device.

Computing device 4 may determine whether computing device 4 has received confirmation that the outgoing communication has been received by a user (90). As one example, a user may press a button on computing device 4 acknowledging that the user has received the outgoing communication. As another example, computing device 4 may receive a confirmation email or SMS from a separate device indicating that the outgoing communication has been received by the user. In certain examples, computing device 4 may determine that the user has not received the outgoing communication when computing device 4 has not received, within a preconfigured amount of time, an incoming communication indicating that the user has received the outgoing communication. When computing device 4 determines that it has received a communication confirming that the user has received the communication ("YES" branch of 90), computing device 4 may wait to receive another incoming communication. When computing device 4 determines that it has not received a communication confirming that the user has received the communication ("NO" branch of 90), computing device 4 may indentify another device determined to be proximate to computing device 4 (e.g., a third device). For instance, computing device 4 may identify the third device as one of a group of devices identified as physically proximate to computing device 4 when computing device 4 identified the second device. In examples where computing device 4 identified the second device from a group of devices based on a priority level, computing device 4 may identify the third device as the device with the next highest priority level as compared to the second device. Computing device 4 may send an outgoing communication to the identified third device, and may wait for a preconfigured amount of time to receive a confirmation that the outgoing communication has been received by the user. If no such communication is received within the preconfigured amount of time, computing device 4 may continue the process of identifying unique devices and sending outgoing communications to those devices until computing device 4 is no longer able to identify a unique device or has identified a preconfigured threshold number of devices (e.g., a threshold amount of devices preconfigured using user interface 56).

Figure 5:
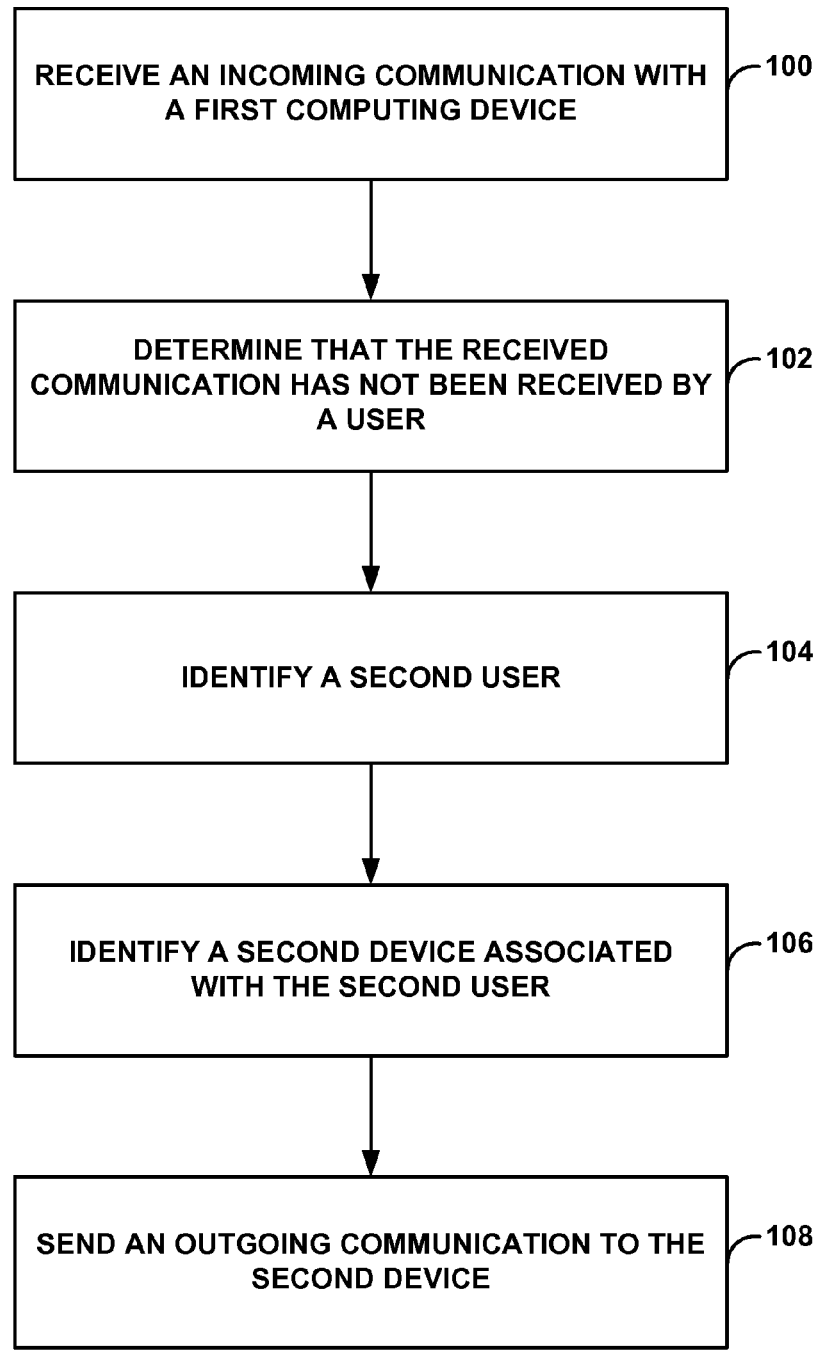
FIG. 5 is a flow diagram illustrating an example operation of a computing device for notifying another computing device of a missed communication, in accordance with one or more aspects of this disclosure.

FIG. 5 is a flow diagram illustrating an example operation of a computing device for notifying another computing device of a missed communication, in accordance with one or more aspects of this disclosure. For purposes of illustration only, the example method is described below within the context of communication system 2 of FIG. 1 and computing device 4 of FIG. 2. Computing device 4 may receive an incoming communication (100) and determine that the received communication has not been received by a user (102) (e.g., using missed communication determination module 44 of FIG. 2).

Computing device 4 may identify a second user (104). As an example, computing device 4 may access a contacts list associated with computing device 4 to identify a second user who may be proximate to the user of the computing device. For instance, the contacts list may associate a contact name or identifier with one or more phone numbers, email addresses, or both. In some examples, the contacts list may indicate a relationship between the user of computing device 4 and the contact in the contacts list (e.g., spouse, child, brother, and the like). In certain examples, the second user may be identified based on the relationship between the second user and the user of the computing device 4 (e.g., using second device identification module 46 of FIG. 2).

Computing device 4 may identify a second device associated with the second user (106). For example, computing device 4 may identify the second device as one of the devices associated with the second user in the contacts list. Computing device 4 may send an outgoing communication to the second device (108). Examples of outgoing communications may include, but are not limited to, one or more of telephonic communications, email communications, and SMS communications.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
   receiving, with a first computing device, an incoming communication;
   determining, with the first computing device, that a user has not taken an action with the first computing device with respect to the incoming communication;
   prior to configuring the first computing device to communicate with a second device, identifying, with the first computing device, the second device determined to be physically proximate to the first computing device;

dynamically configuring, with the first computing device, a network that permits communication between the first computing device and the second device;

sending, with the first computing device via the network, a first outgoing communication to the identified second device, wherein the first outgoing communication is based at least on the received incoming communication;

responsive to determining, with the first computing device, that the user has not taken an action with the second device with respect to the incoming communication, identifying, by the first computing device, a third device proximate to the first computing device by at least identifying a group of devices connected to a different network, wherein the first computing device is connected to the different network, and wherein the third device comprises one of the devices in the group of devices connected to the different network; and sending, with the first computing device, via the different network, a second outgoing communication to the identified third device, wherein the second outgoing communication is based at least in part on the received incoming communication.

2. The method of claim 1, further comprising:
determining, with the first computing device, that the received communication is an important communication, wherein identifying the second device and sending the outgoing communication to the identified second device are responsive to the determination that the received communication is an important communication.

3. The method of claim 2, wherein determining that the received communication is an important communication comprises determining that the sender of the received communication is identified in a predefined list of senders.

4. The method of claim 2, wherein determining that the received communication is an important communication comprises:
identifying a group of times indicating that incoming communications are important; and
determining that the received communication is an important communication based on a time the communication is received and the identified group of times.

5. The method of claim 2, wherein determining that the received communication is an important communication comprises:
identifying a group of content indicating that incoming communications are important; and
determining that the received communication is an important communication when content of the received communication includes at least a portion of the identified group of content.

6. The method of claim 1, further comprising identifying one or more network services supported by the second device, and wherein sending the outgoing communication comprises sending the outgoing communication using at least one of the one or more identified network services.

7. The method of claim 1, wherein the first computing device and the third device are preconfigured to communicate with each other using the different network.

8. The method of claim 1, wherein identifying the second device determined to be proximate to the first computing device comprises identifying the second device based at least on a prioritized list of devices.

9. The method of claim 1, wherein identifying the second device determined to be proximate to the first computing device comprises identifying the second device based at least on a priority associated with a communication protocol used by the first computing device to communicate with the second device.

10. The method of claim 1, wherein identifying the second device determined to be proximate to the first computing device comprises identifying the second device based at least on a physical location of the first computing device.

11. The method of claim 10, wherein identifying the second device based on the physical location of the first computing device comprises identifying the physical location of the first computing device using global positioning system data of the first computing device.

12. The method of claim 10, wherein identifying the second device based on the physical location of the first computing device comprises identifying the physical location of the first computing device using a calendar associated with the first computing device.

13. The method of claim 1, wherein the outgoing communication comprises a notification that the first computing device received the incoming communication.

14. The method of claim 1, further comprising receiving, with the first computing device, a communication from the second device indicating that the user has received the communication.

15. The method of claim 1, wherein the outgoing communication comprises at least one of a telephonic communication, a short message service (SMS) communication, or an email communication.

16. A computer-readable memory comprising instructions that, when executed, cause one or more processors of a first computing device to perform operations comprising:
receiving an incoming communication;
determining that a user has not taken an action with the first computing device with respect to the incoming communication;
prior to configuring the first computing device to communicate with a second device, identifying the second device determined to be physically proximate to the first computing device;
dynamically configuring a network that permits communication between the first computing device and the second device;
sending a first outgoing communication via the network to the identified second device, wherein the first outgoing communication is based at least on the received incoming communication;
responsive to determining, with the first computing device, that the user has not taken an action with second computing device with respect to the incoming communication, identifying, by the first computing device, a third device proximate to the first computing device by at least identifying a group of devices connected to a different network, wherein the first computing device is connected to the different network, and wherein the third device comprises one of the devices in the group of devices connected to the different network; and
sending, with the first computing device, via the different network, a second outgoing communication to the identified third device, wherein the second outgoing communication is based at least in part on the received incoming communication.

17. A computing device, comprising:
an interface configured to receive an incoming communication; and
at least one processor configured to determine that a user has not taken an action with the first computing device with respect to the incoming communication, prior to configuring the first computing device to communicate with a second device, identify the second device determined to be physically proximate to the computing device, dynamically configure a network that permits communication between the first computing device and the second device, send a first outgoing communication via the network to the identified second device, wherein the first outgoing communication is based at least on the received incoming communication, responsive to determining that the user has not taken an action with second computing device with respect to the incoming communication, identify a third device proximate to the first computing device by at least identifying a group of devices connected to a different network, wherein the first computing device is connected to the different network, and wherein the third device comprises one of the devices in the group of devices connected to the different network, and send, via the different network, a second outgoing communication to the identified third device, wherein the second outgoing communication is based at least in part on the received incoming communication.

18. The method of claim 1, wherein dynamically configuring the network comprises dynamically configuring a Transmission Control Protocol/Internet Protocol (TCP/IP) network between the first computing device and the second computing device using zero configuration networking.

\* \* \* \* \*